US010294821B2

(12) United States Patent
Moniz et al.

(10) Patent No.: US 10,294,821 B2
(45) Date of Patent: May 21, 2019

(54) INTERTURBINE FRAME FOR GAS TURBINE ENGINE

(71) Applicant: General Electric Company, Schenectady, NY (US)

(72) Inventors: Thomas Ory Moniz, Loveland, OH (US); Alan Roy Stuart, Cincinnati, OH (US); Jeffrey Donald Clements, Mason, OH (US); Brandon Wayne Miller, Liberty Township, OH (US); Darek Tomasz Zatorski, FortWright, KY (US); Gert Johannes van der Merwe, Lebanon, OH (US); Joel Francis Kirk, Monroe, OH (US); Richard Wesling, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/485,515

(22) Filed: Apr. 12, 2017

(65) Prior Publication Data

US 2018/0298784 A1 Oct. 18, 2018

(51) Int. Cl.
*F01D 25/18* (2006.01)
*F01D 25/16* (2006.01)

(52) U.S. Cl.
CPC ......... *F01D 25/183* (2013.01); *F01D 25/162* (2013.01)

(58) Field of Classification Search
CPC .......... F01D 25/24; F01D 25/26; F01D 25/14; F01D 25/16; F01D 25/162; F01D 9/041; F01D 25/28; F01D 25/183; F02C 3/067
See application file for complete search history.

(56) References Cited

U.S. PATENT DOCUMENTS

| | | | |
|---|---|---|---|
| 3,034,298 | A | 5/1962 | White |
| 3,903,690 | A | 9/1975 | Jones |
| 3,956,887 | A | 5/1976 | MacDonald |
| 4,621,978 | A | 11/1986 | Stuart |
| 4,704,862 | A | 11/1987 | Dennison et al. |

(Continued)

OTHER PUBLICATIONS

U.S. Appl. No. 15/451,498, filed Mar. 7, 2017.

*Primary Examiner* — Gerald L Sung
*Assistant Examiner* — William Breazeal
(74) *Attorney, Agent, or Firm* — Dority & Manning, P.A.

(57) ABSTRACT

The present disclosure is directed to a gas turbine engine defining a radial direction, a circumferential direction, an axial centerline along a longitudinal direction, and wherein the gas turbine engine defines an upstream end and a downstream end along the longitudinal direction, and wherein the gas turbine engine defines a core flowpath extended generally along the longitudinal direction. The gas turbine engine includes a turbine frame defined around the axial centerline, the turbine frame comprising a first bearing surface disposed inward along the radial direction. The gas turbine engine further includes a turbine rotor assembly including a bearing assembly coupled to the first bearing surface of the turbine frame and the turbine rotor assembly. The turbine rotor assembly further includes a first turbine rotor disposed upstream of the turbine frame and a second turbine rotor disposed downstream of the turbine frame. The first turbine rotor and the second turbine rotor are rotatable together about the axial centerline.

19 Claims, 4 Drawing Sheets

(56) References Cited

U.S. PATENT DOCUMENTS

| | | | | |
|---|---|---|---|---|
| 4,860,537 | A | 8/1989 | Taylor | |
| 5,103,635 | A | 4/1992 | Lardellier | |
| 6,546,713 | B1 | 4/2003 | Hidaka et al. | |
| 6,619,030 | B1 | 9/2003 | Seda et al. | |
| 6,666,017 | B2 | 12/2003 | Prentice et al. | |
| 6,763,654 | B2 | 7/2004 | Orlando et al. | |
| 7,048,496 | B2 | 5/2006 | Proctor et al. | |
| 7,716,914 | B2 | 5/2010 | Schilling | |
| 7,966,806 | B2 | 6/2011 | Henry et al. | |
| 8,011,877 | B2 | 9/2011 | Schilling et al. | |
| 8,365,510 | B2 | 2/2013 | Lugg | |
| 8,511,986 | B2 | 8/2013 | Alvanos et al. | |
| 8,667,775 | B1 | 3/2014 | Kisska et al. | |
| 8,708,643 | B2 | 4/2014 | Griffin et al. | |
| 8,919,133 | B2 | 12/2014 | Bart et al. | |
| 9,103,227 | B2 | 8/2015 | Kupratis et al. | |
| 9,494,077 | B2 * | 11/2016 | Chanez | F02C 3/067 |
| 2006/0093466 | A1 * | 5/2006 | Seda | F01D 1/24 415/68 |
| 2010/0089019 | A1 | 4/2010 | Knight et al. | |
| 2013/0067930 | A1 * | 3/2013 | Paradis | F01D 25/243 60/796 |
| 2013/0192200 | A1 * | 8/2013 | Kupratis | F02K 3/072 60/226.3 |
| 2013/0283802 | A1 | 10/2013 | Kim et al. | |
| 2015/0361814 | A1 * | 12/2015 | Bluck | F01D 11/006 416/183 |
| 2016/0069260 | A1 | 3/2016 | Speak et al. | |
| 2016/0102607 | A1 | 4/2016 | Hiernaux | |
| 2016/0130980 | A1 | 5/2016 | McKenny et al. | |

* cited by examiner

INTERTURBINE FRAME FOR GAS TURBINE ENGINE

FIELD

The present subject matter relates generally to gas turbine engine architecture. More particularly, the present subject matter relates to a turbine section for gas turbine engines.

BACKGROUND

Gas turbine engines generally include a turbine section downstream of a combustion section that is rotatable with a compressor section to operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Known interdigitated gas turbine engines (i.e., alternating rows along an axial length of one rotor assembly and another) are limited in longitudinal dimensions, and thus, interdigitation with another turbine rotor that may otherwise increase efficiency or power output is restricted by rotor dynamics, leakages, and other inefficiencies. For example, efficiencies gained by interdigitation may be offset by inefficiencies due to increased gaps at seal interfaces, such as between turbine blades and surrounding shrouds. Increased unsupported turbine axial length due to interdigitation may generally increase leakages across seal interfaces as well as adversely affect rotor dynamics (e.g., vibrations and balance) and/or structural life of the turbine rotors.

Therefore, there is a need for structures that may reduce seal interface clearances, enable further interdigitation of turbine rotors along the engine length, decrease unsupported turbine length, and generally improve gas turbine engine efficiency.

BRIEF DESCRIPTION

Aspects and advantages of the invention will be set forth in part in the following description, or may be obvious from the description, or may be learned through practice of the invention.

The present disclosure is directed to a gas turbine engine defining a radial direction, a circumferential direction, an axial centerline along a longitudinal direction. The gas turbine engine defines an upstream end and a downstream end along the longitudinal direction, and wherein the gas turbine engine defines a core flowpath extended generally along the longitudinal direction. The gas turbine engine includes a turbine frame defined around the axial centerline, the turbine frame including a first bearing surface disposed inward along the radial direction. The gas turbine engine further includes a turbine rotor assembly including a bearing assembly coupled to the first bearing surface of the turbine frame and the turbine rotor assembly. The turbine rotor assembly further includes a first turbine rotor disposed upstream of the turbine frame and a second turbine rotor disposed downstream of the turbine frame. The first turbine rotor and the second turbine rotor are rotatable together about the axial centerline.

In one embodiment, the bearing assembly defines a roller bearing, a ball bearing, a journal bearing, or combinations thereof.

In various embodiments, the turbine frame further includes a vane disposed within the core flowpath of the gas turbine engine, wherein the vane includes a surface defining an airfoil. In one embodiment, the engine further includes an outer turbine casing disposed around the turbine frame, and wherein the turbine frame further includes a spoke extended generally along the radial direction from outward of the outer turbine casing, and coupled thereto, through one or more of the vanes of the turbine frame. In another embodiment, the turbine frame includes three or more spokes. In yet another embodiment, the turbine frame further includes a first bearing housing disposed inward of the vane along the radial direction. In still another embodiment, the spoke is coupled to the first bearing housing inward of the core flowpath of the engine. In still yet another embodiment, the first bearing surface is defined radially inward on the first bearing housing and adjacent to the second turbine rotor of the turbine rotor assembly.

In various embodiments, the first turbine rotor comprises a first rotor hub and the second turbine rotor defines a second rotor hub, and the first rotor hub and the second rotor hub are each coupled in radially adjacent arrangement. In one embodiment, the bearing assembly is coupled to the turbine frame at the first bearing surface, and the bearing assembly is coupled to the turbine rotor assembly at the second rotor hub.

In still various embodiments, the first turbine rotor includes a connecting airfoil coupled to a disk or drum, in which the connecting airfoil is coupled to an outer shroud, and a plurality of outer shroud airfoils extend inward along the radial direction. The second turbine rotor includes a plurality of second airfoils extended outward along the radial direction in the core flowpath. In one embodiment, the gas turbine engine further includes a third turbine rotor including a plurality of third airfoils extended outward along the radial direction in the core flowpath. The third airfoils are interdigitated along the longitudinal direction among the plurality of outer shroud airfoils of the first turbine rotor. In various embodiments, the third turbine rotor defines a high speed or intermediate speed turbine rotor.

In one embodiment, the first turbine rotor and the second turbine rotor together define a low speed turbine rotor.

In various embodiments, the engine further includes a combustion section. The engine defines, in serial flow arrangement along the longitudinal direction, the combustion section, the outer shroud airfoils of the first turbine rotor, the third airfoils of the third turbine rotor, the connecting airfoil of the first turbine rotor, the turbine frame, and the second turbine rotor.

In still various embodiments, the engine further includes an outer bearing support assembly coupled to an inner diameter of the outer shroud of the first turbine rotor, and wherein the outer bearing support assembly is coupled to an outer diameter of a plurality of third airfoils of the third turbine rotor. In one embodiment, the outer bearing support assembly is disposed along the longitudinal direction at a first stage of the third turbine rotor. In another embodiment, the outer bearing support assembly defines a differential foil air bearing.

In various embodiments, the first turbine rotor assembly and the second turbine rotor of the turbine rotor assembly are each coupled to a low pressure (LP) shaft, wherein the turbine rotor assembly and the LP shaft together rotate in a first direction. In one embodiment, the third turbine rotor rotates in a second direction opposite along the circumferential direction of the first direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
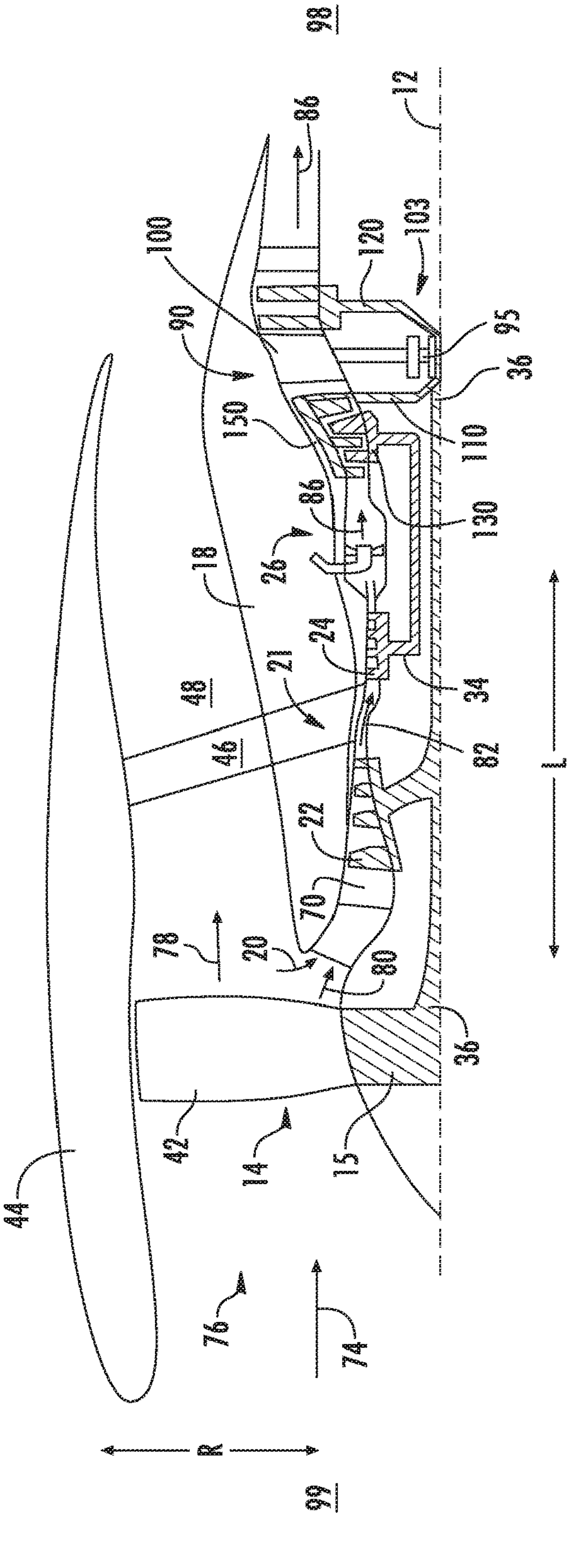
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low", "intermediate", "high", or their respective comparative degrees (e.g. –er, where applicable) each refer to relative speeds within an engine unless otherwise specified. For example, a "low turbine" or "low speed turbine" defines a rotational speed lower than a "high turbine" or "high speed turbine". Alternatively, unless otherwise specified, the aforementioned terms may be understood in their superlative degree. For example, a "low turbine" may refer to the lowest maximum rotational speed turbine within a turbine section, and a "high turbine" may refer to the highest maximum rotational speed turbine within the turbine section.

A gas turbine engine including a turbine frame disposed between a first turbine rotor and a second turbine rotor of a turbine rotor assembly is generally provided. The first turbine rotor is disposed upstream of the turbine frame and the second turbine rotor is disposed downstream of the turbine frame. Each of the first and second turbine rotors are together rotatable about an axial centerline of the engine (i.e., the first and second turbine rotors dependently rotate together). The first and second turbine rotors are coupled together and either rotor couples or rides on a first bearing surface of the turbine frame.

The turbine frame may enable application of an interdigitated turbine section while further including a conventional turbine rotor. For example, the first turbine rotor may define a low speed turbine rotor that is interdigitated with an intermediate or high speed turbine rotor. The second turbine rotor may define a conventional (i.e., non-interdigitated) low speed turbine rotor rotatable with the interdigitated first turbine rotor portion. Therefore, the turbine rotor assembly may together define an interdigitated and non-interdigitated turbine rotor assembly. The turbine frame and the gas turbine engine may reduce seal interface clearances, enable further interdigitation of turbine rotors along the engine length, decrease unsupported turbine length, and generally improve gas turbine engine efficiency. The turbine frame may further enable application of interdigitated turbine sections into turbofan, turboprop, turboshaft, and propfan engines for applications such as, but not limited to, aircraft propulsion. Furthermore, the gas turbine engine including one or more embodiments of the turbine frame described and shown herein may improve engine and aircraft efficiency and performance over known engines of similar axial and/or radial dimensions and/or thrust class.

Figure 2:
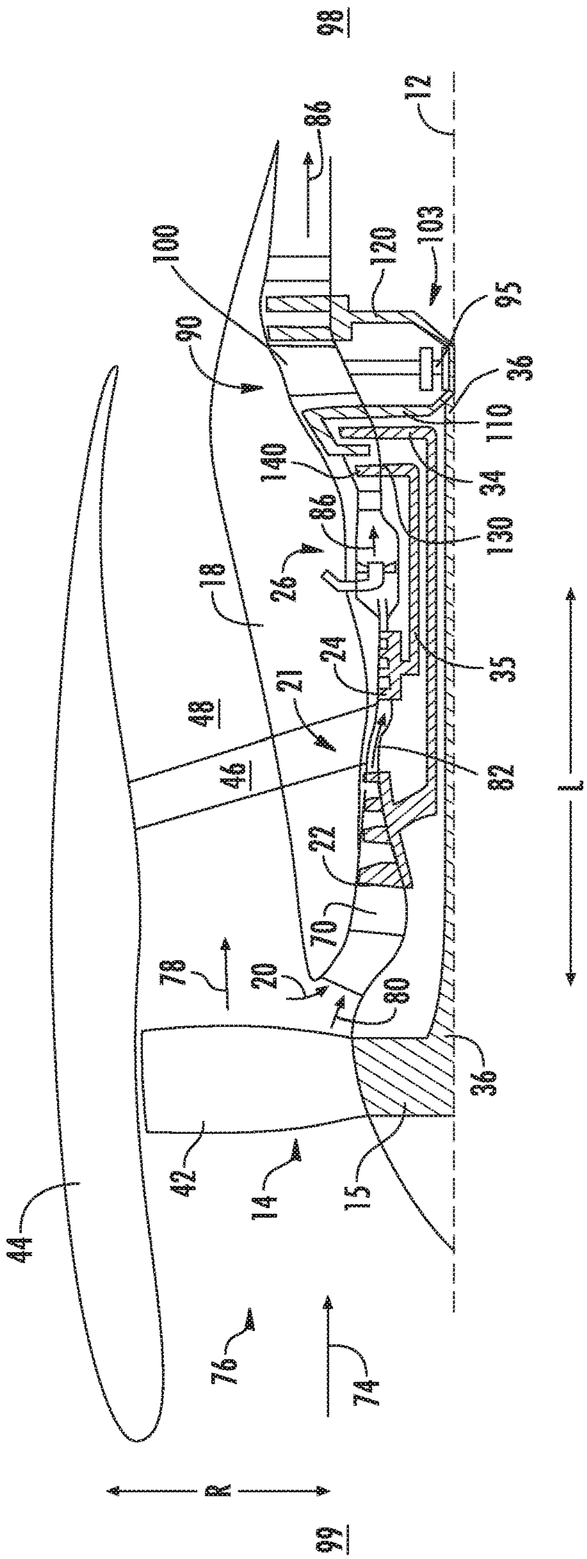
FIG. 2 is a schematic cross sectional view of another exemplary gas turbine engine incorporating an exemplary embodiment of a turbine section according to an aspect of the present disclosure.

Referring now to the drawings, FIGS. 1-2 are schematic cross sectional views of exemplary gas turbine engines 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIGS. 1-2, the engine 10 has a longitudinal or axial centerline axis 12 that extends there through for reference purposes. The engine 10 defines a longitudinal direction L and an upstream end 99 and a downstream end 98 along the longitudinal direction L. The upstream end 99 generally corresponds to an end of the engine 10 along the longitudinal direction L from which air enters the engine 10 and the downstream end 98 generally corresponds to an end at which air exits the engine 10, generally opposite of the upstream end 99 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and the turbine section 90 (herein referred to as "turbine section 90"). Generally, the engine 10 defines, in serial flow arrangement from the upstream end 99 to the downstream end 98, a fan assembly 14, the compressor section 21, the combustion section 26, and the turbine section 90. In the embodiment shown in FIGS. 1-2, the compressor section 21 defines a first compressor 22 and a second compressor 24 in serial flow arrangement.

In the embodiment shown in FIG. 1, the engine 10 defines a two spool gas turbine engine in which the first compressor 22 defines a low pressure compressor (LPC) coupled to a low pressure (LP) shaft 36 and the second compressor 24 defines a high pressure compressor (HPC) coupled to a second shaft 34. In other embodiments, the fan assembly 14 may further include or define one or more stages of a plurality of fan blades 42 that are coupled to and extend outwardly in the radial direction R from a fan rotor 15 and/or a low pressure (LP) shaft 36.

In the embodiment shown in FIG. 2, the engine 10 defines a three spool gas turbine engine in which the first compressor 22 defines an intermediate pressure compressor (IPC) coupled to the second shaft 34. The second compressor 24 defines an HPC coupled to a third shaft 35. The third shaft 35 is drivingly coupled at the turbine section 90 to a high speed turbine 140.

Referring to FIGS. 1-2, an annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

Figure 3:
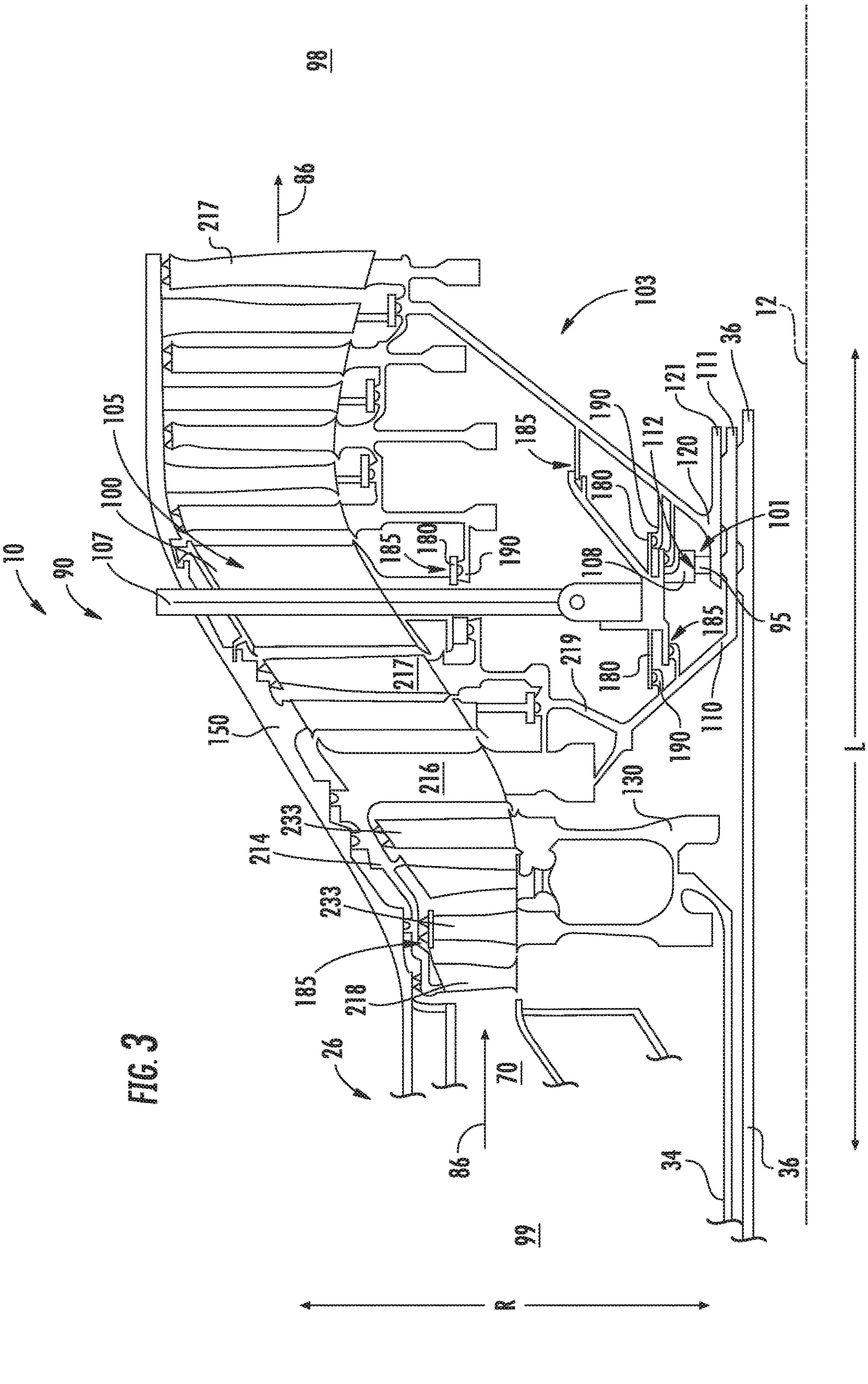
FIG. 3 is a schematic cross sectional view of an embodiment of a turbine frame and the turbine section shown in FIGS. 1-2.
Figure 4:
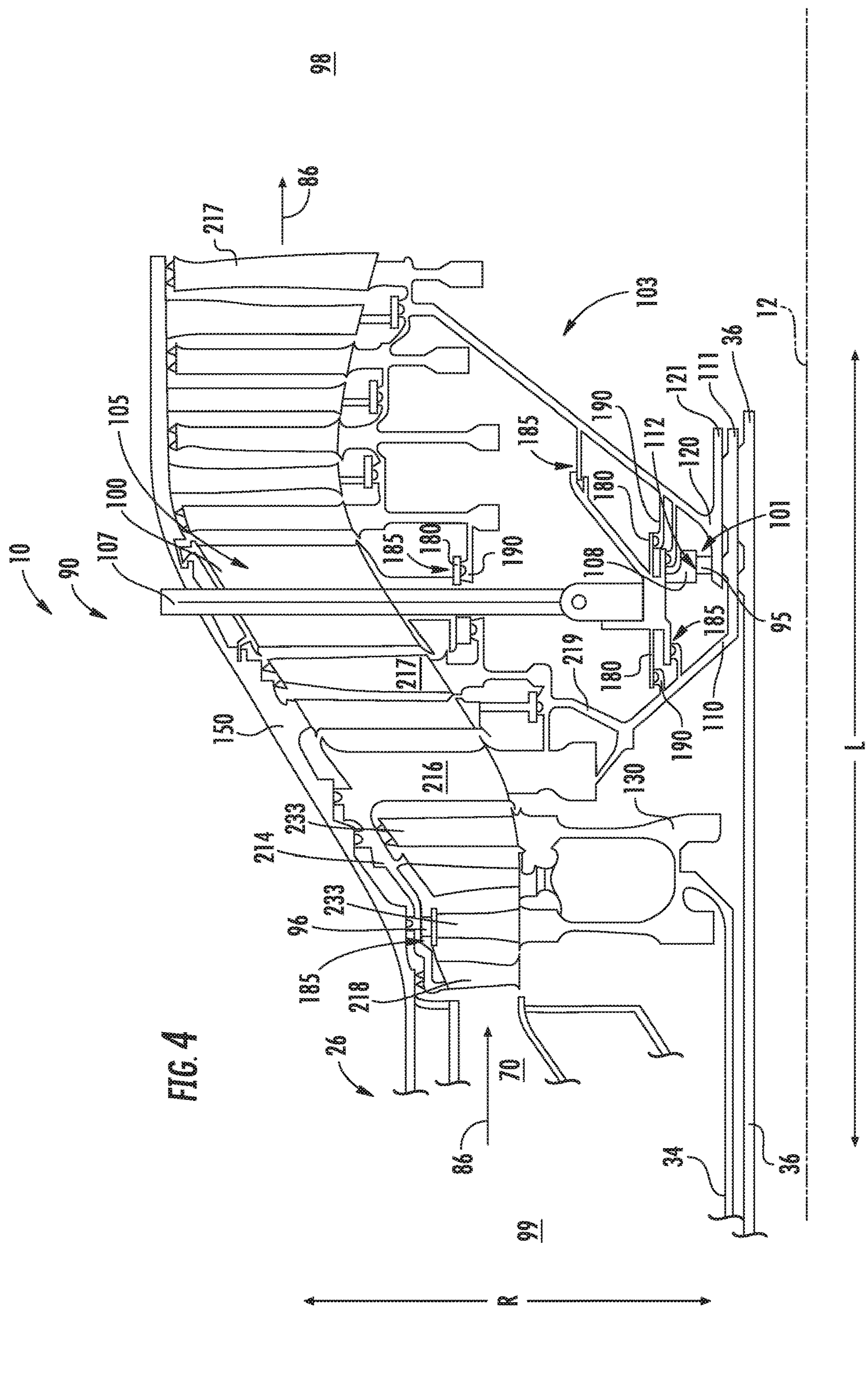
FIG. 4 is a schematic cross sectional view of another embodiment of a turbine section including a turbine frame.

Referring now to FIGS. 3-4, an exemplary embodiment of a portion of the turbine section 90 of the engine 10 shown in FIG. 1 is provided in further detail. The turbine section 90 includes a turbine frame 100 disposed along the longitudinal direction L between a first turbine rotor 110 and a second turbine rotor 120 of a turbine rotor assembly 103.

The turbine frame 100 is defined around the axial centerline 12 of the engine 10. The turbine frame 100 includes a first bearing surface 101 disposed inward along the radial direction R from a core flowpath 70.

The turbine rotor assembly 103 includes a bearing assembly 95 coupled to the first bearing surface 101 of the turbine frame 100 and the turbine rotor assembly 103. In various embodiments, the bearing assembly 95 defines a rolling element bearing, such as a roller bearing or a ball bearing, or a journal bearing. The turbine rotor assembly 103 includes the first turbine rotor 110 disposed upstream of the turbine frame 100. The turbine rotor assembly 103 further includes the second turbine rotor 120 disposed downstream of the turbine frame 100. The first and second turbine rotors 110, 120 are together rotatable about the axial centerline 12 of the engine 10.

In various embodiments, the turbine rotor assembly 103 defines a low speed turbine rotor coupled to the fan assembly 14 of the engine 10 via the LP shaft 36 extended along the longitudinal direction L. The first turbine rotor 110 may define an interdigitated portion of the turbine rotor assembly 103 in which the first turbine rotor 110 is interdigitated (i.e., in alternating arrangement along the longitudinal direction L) with a third turbine rotor 130 defining an intermediate speed or high speed turbine rotor. More specifically, the first turbine rotor 110 including a plurality of outer shroud airfoils 218 extended inward along the radial direction R is interdigitated with the third turbine rotor 130 including a plurality of third airfoils 233 extended outward along the radial direction R. The second turbine rotor 120 may define a portion of the turbine rotor assembly 103 substantially including a plurality of second airfoils 217 extended outward along the radial direction R. As the first and second turbine rotors 110, 120 are coupled together to the LP shaft 36, the turbine rotor assembly 103 may advantageously extract higher energy from further upstream in the turbine section 90 and also extract energy further downstream in the turbine section 90 while including the turbine frame 100 therebetween to reduce an overhung, cantilevered, or unsupported mass of the turbine rotor assembly 103 and/or attenuate undesired rotor dynamics. As such, the turbine frame 100 and turbine rotor assembly 103 arrangement may reduce clearances and leakages at seal interfaces 185, mitigate undesired vibratory modes, reduce rotor unbalance, or mitigate other deleterious effects of a longitudinally extended rotor assembly while enabling energy and work extraction from further upstream and downstream along the turbine section 90.

In one embodiment of the engine 10 as shown in FIG. 1 and FIGS. 3-4, the third turbine rotor 130 defines high speed turbine rotor drivingly connected to and together rotatable with the second shaft 34 about the axial centerline 12. In such an embodiment, the second shaft 34 may define a high pressure (HP) shaft extended along the longitudinal direction L and generally centered about the axial centerline 12. The second shaft 34 defining the HP shaft is connected to the second compressor 24 defining the HPC within the compressor section 21.

In another embodiment of the engine 10 as shown in FIGS. 2-4, the third turbine rotor 130 defines an intermediate speed turbine rotor drivingly connected to and together rotatable with the second shaft 34 about the axial centerline 12. In such an embodiment, the second shaft 34 may define an intermediate pressure (IP) shaft extended along the longitudinal direction L and generally centered about the axial centerline 12. The second shaft 34 defining the IP shaft is connected to the first compressor 22 defining the IPC within the compressor section 21.

During operation of the engine 10 as shown collectively in FIGS. 1-4, the third turbine rotor 130 rotates generally at a higher rotational speed than the turbine rotor assembly 103 including the first turbine rotor 110 and second turbine rotor 120. The turbine rotor assembly 103 including the first and second turbine rotors 110, 120 may rotate in a first direction along the circumferential direction C. The third turbine rotor 130 rotates in a second direction opposite of the first direction. During operation of the engine 10, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed through the fan assembly 14 into a core flowpath 70 defined through the compressor section 21, the combustion section 26, and the turbine section 90. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

Referring back to FIGS. 3-4, the static or stationary turbine frame 100 may include a vane 105 disposed within the core flowpath 70 of the engine 10. The vane 105 includes a surface defining an airfoil. The airfoil defines a suction side, a pressure side, a leading edge, and a trailing edge. The vane 105 may define a static or stationary turning vane, in which combustion gases 86 flowing from the combustion section 26 toward the downstream end 98 may accelerate at least partially along a circumferential direction about the axial centerline 12 as the combustion gases 86 flow past the vane 105. In this fashion, the vane 105 may align or match a velocity of the combustion gases 86 along the circumferential direction to the second turbine rotor 120 downstream of the vane 105.

Referring still to FIGS. 3-4, the turbine frame 100 may further includes a first bearing housing 108 disposed inward of the vane 105 along the radial direction R. The first bearing housing 108 is generally annular and centered about the axial centerline 12. The one or more spokes 107 may extend through the vanes 105 and couple to the first bearing housing 108 inward of the core flowpath 70. In various embodiments, the first bearing surface 101 is defined radially inward on the first bearing housing 108 and adjacent to the second turbine rotor 120 of the turbine rotor assembly 103.

Referring to FIGS. 1-4, the engine 10 further includes an outer turbine casing 150 disposed around the turbine frame 100 and extended generally along the longitudinal direction L. The turbine frame 100 may further include one or more spokes 107 extended generally along the radial direction R from outward of the outer turbine casing 150. The spoke 107 is coupled to the outer turbine casing 150 at the radially outward area of the outer turbine casing 150. The spoke 107 may further be coupled to one or more of the vanes 105 of the turbine frame 100. In various embodiments, the turbine frame 100 includes three or more spokes 107. For example, the spokes 107 may be disposed generally equidistant along the circumferential direction C. The spokes 107 may be adjustable and align the turbine frame 100, or portions thereof, concentrically about the axial centerline 12 of the engine 10. For example, the plurality of spokes 107 may each include adjustable linkages that adjust each spoke 107 linearly. The spokes 107 may be disposed circumferentially equidistant about the centerline 12 so as to enable adjusting concentricity of the first bearing housing 108 relative to the outer turbine case 150 and/or the axial centerline 12.

In various embodiments, the first bearing surface 101 may be generally parallel to the axial centerline 12. Alternatively, the first bearing surface 101 may be approximately perpendicular to the force applied by the turbine rotor assembly 103. In one embodiment, the first bearing surface 101 may be tapered at an acute angle relative to the axial centerline 12. For example, the first bearing surface 101 may define an angled surface against which the bearing assembly 95, such as defining a tapered roller bearing or thrust bearing, may exert force in at least the longitudinal direction L and the radial direction R.

In still various embodiments, the turbine frame 100 defines a platform 112 onto which the first bearing surface 101 is coupled. The platform 112 may define an annular surface or bore on the turbine frame 100 inward of the core flowpath 70 of the engine 10. For example, the platform 112 may be define an annular surface or bore on the first bearing housing 108 of the turbine frame 100.

In one embodiment, the platform 112 defines the first bearing surface 101 via dimensional and geometrical tolerances appropriate for bearings 95 and/or outer races on which bearings 95 ride.

In another embodiment, the platform 112 defines a sleeve fitted to the turbine frame 100 on which the bearing assembly 95 is installed or coupled. In various embodiments, the turbine frame 100 at the platform 112 may define a surface roughness or a fit, such as a loose fit, tight fit, or interference fit, onto which the bearing assembly 95 is coupled to the turbine frame 100. In still various embodiments, the second turbine rotor 120 may define a surface roughness or a fit, such as a loose fit, tight fit, or interference fit corresponding to the platform 112.

Referring now to FIGS. 3-4, the first turbine rotor 110 includes a first rotor hub 111 and the second turbine rotor 120 includes a second rotor hub 121. Each hub 111, 121 extends generally along the longitudinal direction L and is annular about the axial centerline 12 of the engine 10. Each hub 111, 121 generally provides a surface area at each turbine rotor 110, 120 to couple to one another and/or to the LP shaft 36. In the embodiments shown in FIGS. 3-4, the first rotor hub 111 and the second rotor hub 121 are together coupled in adjacent arrangement along the radial direction R. Still further, the LP shaft 36 is coupled to the first rotor hub 111 in adjacent arrangement along the radial direction R. In one embodiment, the first rotor hub 111, the second rotor hub 121, and/or the LP shaft 36 may each define a surface roughness or fit, such as an tight fit or interference fit, that may enable coupling each hub 111, 121 and the LP shaft 36 in radially adjacent arrangement. In another embodiment, the first rotor hub 111, the second rotor hub 121, and/or the LP shaft 36 may define a spline connection in which the mating pairs of hubs 111, 121, or the hubs 111, 121 and LP shaft 36, or combinations thereof, may mesh among one another. In various embodiments, the hubs 111, 121 and the LP shaft 36 may be coupled via a combination of spline connections or fits.

In one embodiment, the bearing assembly 95 is coupled to the turbine frame 100 at the first bearing surface 101. The bearing assembly 95 is further coupled to the turbine rotor assembly 103 at the second rotor hub 121 of the second turbine rotor 120.

Referring still to FIGS. 3-4, the first turbine rotor 110 includes a connecting airfoil 216 coupling a disk or drum 219 to an outer shroud 214 extended along the longitudinal direction L toward the upstream end 99. The disk or drum 219 is coupled to the LP shaft 36 on an inward end in the radial direction R. The plurality of the connecting airfoils 216 are coupled to the disk or drum 219 in circumferential arrangement. A radially outward end of the connecting airfoils 216 is coupled to the outer shroud 214. A plurality of outer shroud airfoils 218 are coupled to the outer shroud 214 and extend inward along the radial direction R.

In the embodiment shown in FIGS. 3-4, the first turbine rotor 110 defining a low speed turbine is interdigitated among the third turbine rotor 130 defining an intermediate speed turbine or high speed turbine. The first turbine rotor 110 is interdigitated via the outer shroud 214 extended radially outward of the third turbine rotor 130 and extended along the longitudinal direction L toward the upstream end 99 of the turbine section 90. The turbine frame 100 further supports the first turbine rotor 110 toward the upstream end 99 and the second turbine rotor 120 toward the downstream end 98 via the first bearing surface 101 in contact with the bearing assembly 95 at the axially extended second rotor hub 121 of the second turbine rotor 120. As such, the turbine frame 100 enables extending a first stage of the first turbine rotor 110 of the turbine rotor assembly 103 defining a low speed turbine forward or upstream of the third turbine rotor 130 defining the intermediate or high speed turbine.

For example, the engine 10 may generally define, in serial flow arrangement along the longitudinal direction L, the combustion section 26, the outer shroud airfoils 218 of the first turbine rotor 110, the third airfoils 233 of the third turbine rotor 130, the connecting airfoils 216 of the first turbine rotor 110, the turbine frame 100, and the second turbine rotor 120. In various embodiments, the engine 10 may include several iterations of alternating outer shroud airfoils 218 and third airfoils 233 along the longitudinal direction L upstream of the connecting airfoils 216. In still other embodiments, the first turbine rotor 110 may further include one or more stages of second airfoils 217 extended outward along the radial direction R from the disk or drum 219, such as downstream or aft of the connecting airfoils 216.

Extending the first stage of the first turbine rotor 110 forward or upstream of the third turbine rotor 130 defining a high speed turbine may enable removing a static or stationary first turbine vane or nozzle from between the combustion section 26 or a combustion chamber and the turbine section 90 or a first rotor downstream of the combustion section 26, such as shown in FIG. 1. Removing the first turbine vane or nozzle that is conventionally included in gas turbine engines enables designing the first stages of the turbine section 90 (i.e., the upstream-most stages of the turbine section 90 immediately downstream of the combustion section 26) to a lower average annular combustion temperature rather than a higher peak annular combustion temperature (i.e., combustion hot spots). Therefore, the turbine frame 100 enabling the first turbine rotor 110 as the first stage of the turbine section 90 may enable the engine 10 to utilize less cooling air diverted from compression or combustion. The turbine frame 100 may further enable the engine 10 to include uncooled structures and materials further upstream along the turbine section 90, generally expand design tolerances of the combustion section, and/or generally increase gas turbine engine efficiency.

Referring now to FIG. 4, the embodiment of the engine 10 and turbine section 90 generally provided may further include an outer bearing support assembly 96 coupled to the third turbine rotor 130 and the outer shroud 214 of the first turbine rotor 110. More specifically, the outer bearing support assembly 96 may be coupled to an inner diameter of the outer shroud 214 of the first turbine rotor 110 and to an outer diameter of the plurality of third airfoils 233 of the third turbine rotor 130. The plurality of third airfoils 233 may be coupled along the circumferential direction to provide an annular surface or platform for the outer diameter of the third airfoils 233 onto which the outer bearing support assembly 96 may be coupled.

In one embodiment such as shown in FIG. 4, the outer bearing support assembly 96 is disposed along the longitudinal direction L at a first stage of the third turbine rotor 130. For example, the outer bearing support assembly 96 may be coupled to the outer shroud 214 radially outward of the plurality of third airfoils 233 proximate to the forward- or upstream-most end of the first turbine rotor 110. In other embodiments, the outer bearing support assembly 96 may be additionally or alternatively disposed downstream or aft along the longitudinal direction L of the first stage of the first turbine rotor 110.

In various embodiments, the outer bearing support assembly 96 defines a differential foil air bearing. The outer bearing support assembly 96 may include an inner race, and outer race, and a foil element therebetween. For example, the inner race may be coupled to an outer diameter of the third airfoils 233 of the third turbine rotor 130. The outer race may be coupled to an inner diameter of the outer shroud 214 of the first turbine rotor 110. Either the inner race or the outer race may include a foil element that contacts the radially adjacent race.

The outer bearing support assembly 96 may provide support for the first turbine rotor 110 extended forward or upstream from the turbine frame 100 toward the combustion section 26. The support provided by the outer bearing support assembly 96 may attenuate undesired vibratory modes or mitigate or eliminate an unsupported free radius of the first turbine rotor 110 extended toward the upstream end 99 of the engine 10. The outer bearing support assembly 96 may mitigate or eliminate an unsupported length or radius of the first turbine rotor 110 extended toward the upstream end 99 of the engine 10. The outer bearing support assembly 96, in conjunction with the turbine frame 100, may enable a turbine rotor assembly 103 to extend generally from the forward- or upstream-most end of the turbine section 90 (e.g., forward or upstream of the third turbine rotor 130 defining a high speed turbine, or immediately downstream of the combustion section 26) to the aft- or downstream-most end of the turbine section 90. The outer bearing support assembly 96 and the turbine frame 100 may together enable the turbine rotor assembly 103 to harness energy throughout the entire turbine section 90 to more efficiently drive the fan assembly 14 while mitigating increases in overall engine length along the longitudinal direction L or engine radius along the radial direction R.

Referring now to FIGS. 3-4, the turbine frame 100 and one or more of the turbine rotors 110, 120 may together define a seal interface 185 including a shroud 180 and a seal 190. In various embodiments, the one or more shrouds 180 may define a wall or platform extended at least partially in the longitudinal direction L. In one embodiment, the shroud 180 is adjacent to the seals 190 in the radial direction R. The one or more seals 190 may define a knife fin, knife edge, or labyrinth seal that extends generally toward the shroud 180 to define a generally pointed end that may contact the shroud 180. The shrouds 180, seals 190, airfoils 216, 217, 218 or other portions of the turbine section 90 may further include coatings on surfaces of the shrouds 180 and/or seals 190, such as, but not limited to, thermal coatings, including one or more layers of bond coats and thermal coats, or abrasives such as diamond or cubic boron nitride, aluminum polymer, aluminum boron nitride, aluminum bronze polymer, or nickel-chromium-based abradable coatings. Coatings may be applied by one or more methods, such as plasma spray, thermal spray, gas phase, or other methods.

The various embodiments of the turbine section 90 generally shown and described herein may be constructed as individual blades installed into drums, disks, or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 90, or portions or combinations of portions thereof, may be formed using additive manufacturing or 3D printing, or casting, forging, machining, or castings formed of 3D printed molds, or combinations thereof. The turbine section 90, or portions thereof, may be mechanically joined using fasteners, such as nuts, bolts, screws, pins, tie rods, or rivets, or using joining methods, such as welding, brazing, bonding, friction or diffusion bonding, etc., or combinations of fasteners and/or joining methods. Still further, it should be understood that the first turbine rotor 110 may incorporate features that allow for differential expansion. Such features include, but are not limited to, aforementioned methods of manufacture, various shrouds, seals, materials, and/or combinations thereof.

The systems and methods shown in FIGS. 1-4 and described herein may decrease fuel consumption, increase operability, increase engine performance and/or power output while maintaining or reducing weight, part count, and/or packaging (e.g. radial and/or axial dimensions). The systems provided herein may allow for increased high bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency.

Still further, the systems shown in FIGS. 1-4 and described herein may reduce a product of a flow area and the square of the rotational speed (the product herein referred to as "$AN^2$") of the gas turbine engine. For example, engine 10 shown and described in regard to FIGS. 1-4 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 90 (compared to engines of similar thrust output and packaging) by interdigitating the first turbine rotor 110 among the one or more stages of the third turbine rotor 130 while also defining at the second turbine rotor 120 a non-digitated turbine structure toward the downstream end 98 of the turbine section 90. Therefore, the first turbine rotor 110 may increase the quantity of rotating stages of airfoils while reducing the average stage work factor, and therefore the $AN^2$, while mitigating increases in axial length to produce a similar $AN^2$ value. The first turbine rotor 110 may further reduce the $AN^2$ while additionally reducing the overall quantity of airfoils, rotating and stationary, in the turbine section 90 relative to turbine sections of gas turbine engines of similar power output and/or packaging.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, wherein the gas turbine engine defines a radial direction, a circumferential direction, an axial centerline along a longitudinal direction, and wherein the gas turbine engine defines an upstream end and a downstream end along the longitudinal direction, and wherein the gas turbine engine defines a core flowpath extended generally along the longitudinal direction, the gas turbine engine comprising:

a turbine frame defined around the axial centerline, the turbine frame comprising a first bearing surface disposed inward along the radial direction;

a single bearing assembly; and a turbine rotor assembly coupled to the first bearing surface of the turbine frame and through the single bearing assembly, wherein the turbine rotor assembly further comprises a first turbine rotor disposed upstream of the turbine frame and coupled to the single bearing assembly and a second turbine rotor disposed downstream of the turbine frame and coupled to the single bearing assembly, wherein the first turbine rotor comprises a connecting airfoil attached to an outer shroud disposed radially outward of the core flowpath therethrough, and further wherein the first turbine rotor comprises a first rotor hub and the second turbine rotor comprises a second rotor hub, and wherein the first rotor hub and the second rotor hub are radially nested and radially coupled together so as to rotate in unison about a common centerline.

2. The gas turbine engine of claim 1, wherein the first turbine rotor and the second turbine rotor together define a low speed turbine rotor.

3. The gas turbine engine of claim 1, wherein the turbine frame further comprises a vane disposed within the core flowpath of the gas turbine engine, wherein the vane comprises a surface defining an additional airfoil.

4. The gas turbine engine of claim 3, the engine further comprising:

an outer turbine casing disposed around the turbine frame, and wherein the turbine frame further comprises a spoke extended along the radial direction from outward of the outer turbine casing, and coupled to the outer turbine casing, through one or more vanes of the turbine frame.

5. The gas turbine engine of claim 4, wherein the turbine frame comprises three or more spokes.

6. The gas turbine engine of claim 5, wherein the turbine frame further comprises a first bearing housing disposed inward of the additional vane along the radial direction.

7. The gas turbine engine of claim 6, wherein the spoke is coupled to the first bearing housing inward of the core flowpath of the engine.

8. The gas turbine engine of claim 6, wherein the first bearing surface is defined radially inward on the first bearing housing and adjacent to the second turbine rotor of the turbine rotor assembly.

9. The gas turbine engine of claim 1, wherein the single bearing assembly is coupled to the first turbine rotor assembly at the first rotor hub, and wherein the single bearing assembly is coupled to the second turbine rotor assembly at the second rotor hub.

10. The gas turbine engine of claim 1, wherein the first turbine rotor comprises the connecting airfoil coupled to a disk or drum, and wherein a plurality of outer shroud airfoils extend inward along the radial direction from the outer shroud, and wherein the second turbine rotor comprises a plurality of second airfoils extended outward along the radial direction in the core flowpath.

11. The gas turbine engine of claim 10, further comprising a third turbine rotor, wherein the third turbine rotor comprises a plurality of third airfoils extended outward along the radial direction in the core flowpath, the third airfoils interdigitated along the longitudinal direction among the plurality of outer shroud airfoils of the first turbine rotor.

12. The gas turbine engine of claim 11, wherein the third turbine rotor defines a high speed or intermediate speed turbine rotor.

13. The gas turbine engine of claim 1, wherein the single bearing assembly defines a roller bearing, a ball bearing, a journal bearing, or combinations thereof.

14. The gas turbine engine of claim 11, further comprising a combustion section, and wherein the engine defines, in serial flow arrangement along the longitudinal direction, the combustion section, the plurality of outer shroud airfoils of the first turbine rotor, the plurality of third airfoils of the third turbine rotor, the connecting airfoil of the first turbine rotor, the turbine frame, and the second turbine rotor.

15. The gas turbine engine of claim 10, further comprising an outer bearing support assembly coupled to an inner diameter of the outer shroud of the first turbine rotor, and wherein the outer bearing support assembly is coupled to an outer diameter of the plurality of third airfoils of the third turbine rotor.

16. The gas turbine engine of claim 15, wherein the outer bearing support assembly is disposed along the longitudinal direction at a first stage of the third turbine rotor.

17. The gas turbine engine of claim 15, wherein the outer bearing support assembly defines a differential foil air bearing.

18. The gas turbine engine of claim 11, wherein the first turbine rotor assembly and the second turbine rotor of the turbine rotor assembly are each coupled to a low pressure (LP) shaft, wherein the turbine rotor assembly and the LP shaft together rotate in a first direction.

19. The gas turbine engine of claim 18, wherein the third turbine rotor rotates in a second direction opposite along a circumferential direction of the first direction.

* * * * *